United States Patent
Kasuga et al.

(10) Patent No.: US 9,212,961 B2
(45) Date of Patent: Dec. 15, 2015

(54) GRINDING ABNORMALITY MONITORING METHOD AND GRINDING ABNORMALITY MONITORING DEVICE

(75) Inventors: Tomoyuki Kasuga, Nagoya (JP); Atsushi Saito, Aichi (JP); Takayuki Yoshimi, Toyohashi (JP); Masao Ikeda, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 169 days.

(21) Appl. No.: 13/884,777

(22) PCT Filed: Dec. 22, 2011

(86) PCT No.: PCT/JP2011/079782
§ 371 (c)(1),
(2), (4) Date: Jul. 19, 2013

(87) PCT Pub. No.: WO2012/098805
PCT Pub. Date: Jul. 26, 2012

(65) Prior Publication Data
US 2014/0033830 A1 Feb. 6, 2014

(30) Foreign Application Priority Data
Jan. 21, 2011 (JP) .................... 2011-010708

(51) Int. Cl.
*G01L 5/12* (2006.01)
*G01L 5/00* (2006.01)
(Continued)

(52) U.S. Cl.
CPC ............. *G01L 5/0076* (2013.01); *B24B 5/04* (2013.01); *B24B 19/06* (2013.01); *B24B 49/003* (2013.01); *B24B 49/105* (2013.01); *B24B 49/14* (2013.01); *B24B 49/16* (2013.01); *G01L 5/12* (2013.01)

(58) Field of Classification Search
CPC ......... G01L 5/12; G01L 5/0019; G01M 13/04

USPC ....................... 73/862.49; 702/182
See application file for complete search history.

(56) References Cited

U.S. PATENT DOCUMENTS

| 7,403,868 B2 * | 7/2008 | Maekawa et al. ............. 702/182 |
| 2003/0163286 A1 * | 8/2003 | Yasugi .......................... 702/185 |

FOREIGN PATENT DOCUMENTS

| JP | 62 63063 | | 3/1987 |
| JP | 2 48165 | | 2/1990 |
| JP | 4 176541 | | 6/1992 |
| JP | 05069311 A | * | 3/1993 |
| JP | 2001 9675 | | 1/2001 |

(Continued)

OTHER PUBLICATIONS

International Search Report Issued Jan. 24, 2012 in PCT/JP11/079782 Filed Dec. 22, 2011.

*Primary Examiner* — Max Noori
*Assistant Examiner* — Nathaniel T Woodward
(74) *Attorney, Agent, or Firm* — Oblon, McClelland, Maier & Neustadt, L.L.P.

(57) ABSTRACT

A grinding abnormality monitoring method and device for grinding a plurality of works of the same type are proposed which can improve the accuracy of judgment whether an abnormality is generated or not by properly setting a threshold value. According to the method or the device, by setting at least one of upper and lower limit values of a trial grinding load detected at the trial grinding of at least one of the works, an occurrence of grinding abnormality is judged when an actual grinding load detected at the actual grinding of work exceeds at least one of the upper and lower limit values thereof which varies depending on the time elapsed from the start of the actual grinding or a position of work relative to a grinding wheel.

8 Claims, 15 Drawing Sheets

(51) Int. Cl.
*B24B 49/16* (2006.01)
*B24B 19/06* (2006.01)
*B24B 49/00* (2012.01)
*B24B 49/10* (2006.01)
*B24B 49/14* (2006.01)
*B24B 5/04* (2006.01)

(56) References Cited

FOREIGN PATENT DOCUMENTS

JP 2002 166353 6/2002
JP 2003 117815 4/2003

\* cited by examiner

Fig. 9

| Work No. | Abnormality determination result |
|---|---|
| Work No.1 | [Normal] |
| Work No.2 | [Normal] |
| ⋮ | |
| Work No.k | [Caution] Type: △△  Generation time: dd/hh/mm/ss |
| Work No.k+1 | [Caution] Type: △△  Generation time: dd/hh/mm/ss |
| ⋮ | |
| Work No.n | [Warning] Type: □□  Generation time: dd/hh/mm/ss |

GRINDING ABNORMALITY MONITORING METHOD AND GRINDING ABNORMALITY MONITORING DEVICE

TECHNICAL FIELD

This invention relates to a method for monitoring grinding abnormality and relates to a device for monitoring grinding abnormality when a plurality of works of the same kind is ground.

BACKGROUND OF THE TECHNOLOGY

Japanese Patent Publication No. 4-176541 (Patent Document 1), for example, describes a method for determining abnormality in the processing of works, which determines that an abnormality is generated when a current value of a tool feed motor exceeds a set threshold value. In other words, the method determines that the abnormality is generated when a processing resistance becomes larger than a set value.

SUMMARY OF THE INVENTION

Problems to be Solved

In the production of mass-produced products, many works of the same kind are ground. When many works of the same kind are ground, various factors such as variation in the shape of works in a material state or variation in the cutting quality of grinding wheels causes variation in the grinding load. Therefore, if a permissible range between threshold values is set too narrow, it may be determined that an abnormality is generated when it should be determined to be normal. On the other hand, if the permissible range between the threshold values is set too wide, an abnormality may not be determined accurately.

The present invention has been made in consideration of the above circumstances. The object of the invention is to provide a grinding abnormality monitoring method and a grinding abnormality monitoring device which can improve the accuracy of grinding abnormality determination by setting threshold values more appropriately when a plurality of works of the same kind is ground.

Means for Solving the Problems (Grinding Abnormality Monitoring Method)

(1) A grinding abnormality monitoring method according to the present invention uses a grinding machine which grinds a work by moving the work relative to a grinding wheel and thereby monitoring grinding abnormality when a plurality of the works of the same kind is ground. The method comprises a trial grinding load detection step for detecting a trial grinding load when a trial grinding of at least one of the work is performed, a threshold value setting step for setting at least one of upper and lower limit threshold values of the trial grinding load detected in the trial grinding load detection step, the upper and lower threshold values varying according to an elapsed time from a start of a grinding or to a position of the work relative to the grinding wheel, an actual grinding load detection step for detecting an actual grinding load when an actual grinding of the plurality of the works is performed and a grinding abnormality determination step for determining that the grinding abnormality is generated when the actual grinding load detected in the actual grinding load detection step exceeds the upper limit threshold value or falls below the lower limit threshold value, the upper and lower limit threshold values varying according to the elapsed time from the start of the grinding or to the position of the work relative to the grinding wheel.

According to the present invention, the threshold values are set based on the trial grinding load used in the trial grinding. Especially, the threshold values are set so as to vary according to the elapsed time from the start of the grinding or the relative position between the work and the grinding wheel. For example, the grinding load gradually increases after the start of the grinding, then stays approximately constant, and finally gradually decreases. When a finish grinding is performed after a rough grinding, the grinding load also varies according to the kind of grinding. In other words, it is possible to set the threshold value appropriately for each status during the period from the start to the end of the grinding by setting the threshold value so as to vary according the trial grinding load used in the trial grinding. Consequently, it is possible to set a highly accurate threshold value that has been difficult with conventional constant threshold value type.

As for the threshold values, only one of or both of upper and lower limit threshold values may be set. The upper limit threshold value is a threshold value for determining that a grinding abnormality is generated when the actual grinding load exceeds the upper limit threshold value. The lower limit threshold value is a threshold value for determining that a grinding abnormality is generated when the actual grinding load falls below the lower limit threshold value.

The grinding load is a load applied to the grinding wheel and the work as a result of the grinding of the work by the grinding wheel. The grinding load can be calculated based on values such as an electric current or an electric power of a motor which drives the grinding wheel, an electric current or an electric power of a drive shaft of the motor which moves the grinding wheel relative to the work, an electric current or an electric power of a motor which rotatably drives the work, or a deflection amount of a supported portion of the grinding wheel or the work. The grinding load can also be calculated based on a deformation amount of a portion to be ground of the work W, in other words, a deflection amount of the work W caused by a pressing of the work W against the grinding wheel 43. This is because the deflection amount varies according to the grinding load.

The threshold values may be either a threshold value of the grinding load at the elapsed time from the start of grinding, or a threshold value of the grinding load at the position of the work relative to the grinding wheel. As long as the relative displacement speed between the work and the grinding wheel, which is one of the grinding conditions, is changed, the both are kept in one-on-one relationship.

Furthermore, if a worker makes an error in inputting the displacement speed, the error can be found in early stage by observing the behavior of the trial grinding load during the trial grinding. Thus, producing a large number of defective products can be prevented.

(2) The threshold value setting step may further includes steps for setting the upper and lower limit threshold values and a step for setting a width therebetween which varies according to the elapsed time from the start of the grinding or to the position of the work relative to the grinding wheel.

Thus, a more appropriate threshold value can be set. Variation in the grinding load among the works may differ, for example, between under a rapidly increasing load immediately after the start of the grinding and under a constant load. The grinding load varies widely among the works under an increasing grinding load immediately after the start of the grinding, compared to under a constant grinding load. Therefore, for example, the width value between the upper limit threshold value and the lower limit threshold value (permissible width) under an increasing trial grinding load is set wider than that under a constant trial grinding load. Consequently, grinding abnormality determination can be performed with a higher accuracy.

(3) The grinding abnormality monitoring method may further comprise further an abnormality-classified area setting step for setting a plurality of abnormality-classified areas which is set depending on the type of abnormality of an abnormal area which is defined to be the value area exceeding the upper limit threshold value or falls below the lower limit threshold value, wherein the grinding abnormality determination step determines the type of the abnormality based on the plurality of the abnormality-classified areas when the grinding abnormality is determined to be generated.

Grinding abnormalities are generally caused by various factors. When it is determined that a grinding abnormality is generated, it is possible to recognize the type of the grinding abnormality by determining the grinding abnormality type based on the set abnormality-classified areas. Grinding abnormality types include generation of abnormal grinding load (e.g. grinding burn), abnormalities due to variation in the shape of the work caused by preprocessing, surface abnormalities of the grinding wheel, defective surface roughness of the work after grinding, and others. Abnormalities due to variation in the shape include, for example, an abnormality due to variation in the location or depth of a groove (the track surface on the inner periphery of the bearing outer race) caused by preprocessing, when the groove is to be ground. Surface abnormalities of the grinding wheel include flattening of abrasive grains due to incorrect dressing of the grinding wheel (e.g. abnormality in dressing allowance or poor cutting quality of the dresser), coming off of abrasive grains due to a large grinding load, deterioration of the cutting quality of the grinding wheel due to abrasive grain wear, and attachment of molten scrapes to the surface of the grinding wheel due to a large grinding load or an insufficient amount of coolant and others.

(4) Each of the abnormality-classified areas is set to be a warning area where a continuation of grinding for a next work is prohibited and/or to be a caution area where the continuation of grinding for the next work is allowed. Thus, it is possible to take an appropriate next step according to the abnormality level. For example, generation of an abnormal grinding load is set as the warning area, and the other abnormality types are set as the caution area.

(5) The upper and lower limit threshold values correspond to the position of the work relative to the grinding wheel and the method further comprises a grinding condition changing step for changing a grinding condition so that the actual grinding load on a work to be ground next is set to approach the upper limit threshold value when the actual grinding load on a current work is within the range between the upper and lower limit threshold values.

In grinding abnormality determination, the grinding is determined to be abnormal when the grinding load is within the range between the upper and lower threshold values. As long as the grinding load is within the range between the upper and lower threshold values, it is possible to determine that the grinding is normal when the grinding conditions are changed. Thus, the grinding time, i.e., the grinding cycle time, can be decreased by changing the grinding conditions so that the grinding load approaches the upper limit threshold value within the range between the upper and lower limit threshold values. While the grinding time is changed by changing the grinding conditions, the threshold values in relation to the relative position of the work and the grinding wheel are not changed by changing the grinding conditions. Therefore, when the grinding conditions are changed, the threshold values of the grinding load in relation to the relative position of the work and the grinding wheel is supposed to be used. Accordingly, the grinding conditions can be changed.

(6) The grinding abnormality monitoring method may further comprise an abnormality information output step for performing screen displaying, printing, storing, or outputting to an external device regarding information on the grinding abnormality if the grinding abnormality determination step determines that the grinding abnormality is generated.

By performing screen displaying, printing, storing, or outputting to an external device regarding information on the grinding abnormality, the worker can recognize the grinding abnormality without fail.

(7) The abnormality information output step may further include a step for storing a history of information on the grinding abnormality. It is possible to recognize tendency of grinding abnormalities and to investigate mechanism of grinding abnormality generation by storing the history of information on grinding abnormality. Then, it is possible to predict the generation of grinding abnormality in later grindings by using the tendency of grinding abnormalities and the mechanism of grinding abnormality generation. Consequently, it is possible to decide on appropriate actions for the later grindings.

(8) The method can be applied to a grinding machine for simultaneously grinding a plurality of portions of the work. Each of the trial grinding load detection step and the actual grinding load detection step further includes a step for detecting a deflection amount or a temperature of the plurality of portions of the work by using a plurality of direction sensors or temperature sensors and a step for calculating the respective grinding loads based on the deflection amount or the temperature. The threshold value setting step further includes a step for setting at least one of the upper and lower limit threshold values for each of the plurality of portions of the work and the grinding abnormality determination step further includes a step for determining whether any grinding abnormality is generated at the respective plurality of portions of the work based on the respective actual grinding loads.

Accordingly, when a plurality of portions of the work is ground simultaneously, it is possible to determine the grinding abnormality for each of the portions to be ground.

(Grinding Abnormality Monitoring Device)

(9) A grinding abnormality monitoring device using a grinding machine which grinds a work by moving the work relative to a grinding wheel and thereby monitoring grinding abnormality when a plurality of the works of the same kind are ground, comprises a grinding load detection means for detecting a grinding load at an elapsed time from a start of a grinding or at a position of the work relative to the grinding wheel, a threshold value setting means for setting at least one of upper and lower limit threshold values of a trial grinding load detected by the grinding load detection means when a trial grinding of at least one the work is performed, the upper and lower limit threshold values of the grinding load varying according to the elapsed time from the start of the grinding or to the position of the work relative to the grinding wheel and a grinding abnormality determination means for determining that a grinding abnormality is generated when an actual grinding load detected by the actual grinding load detection means exceeds the at least one of the upper and lower limit threshold values which vary according to the elapsed time from the start of the grinding or to the position of the work relative to the grinding wheel.

The grinding abnormality monitoring device according to the present invention makes it possible to set highly accurate threshold value that has been difficult with conventional constant threshold value type. Other features of the grinding abnormality monitoring method can also be applied to the grinding abnormality monitoring device according to the present invention similarly, and similar results are produced.

BRIEF EXPLANATION OF ATTACHED DRAWINGS

FIG. 9 shows a status of the history display on the screen of the display device.

THE EMBODIMENTS FOR IMPLEMENTING THE INVENTION

<First Embodiment>
(1. Mechanical Structure of Grinding Machine)

A grinding machine 1 will be explained with an example of a grinding machine with a traverse type spindle head, with reference to FIG. 1. As an example, a case will be explained in which a work W to be processed by the grinding machine is a bearing outer race, and a track surface on an inner periphery of the bearing outer race is ground by using the grinding machine 1. In this case, a plurality of the works W of the same kind are ground, in other words, the works W are manufactured as mass-produced products.

Figure 1:
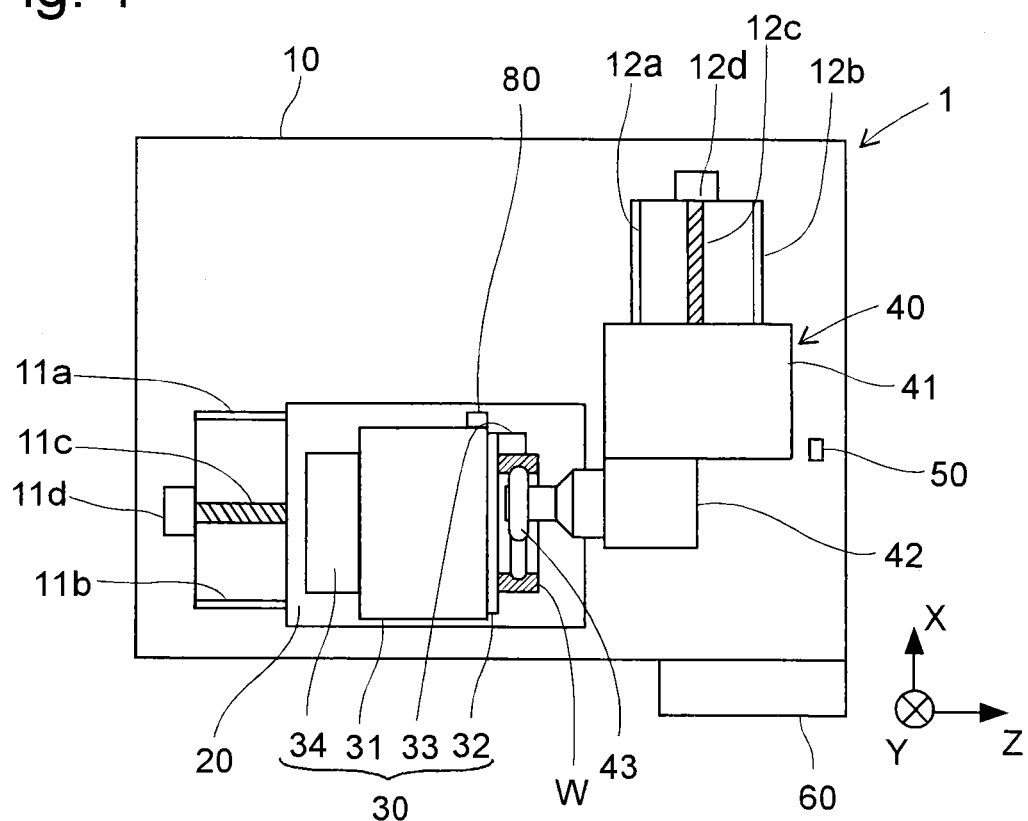
FIG. 1 is a top view of the grinding machine.

As shown in FIG. 1, the grinding machine 1 includes a bed 10, a table 20, a spindle head 30, a grinding wheel support device 40, a proximity switch 50, a contact detection sensor 80, a grinding wheel forming device (not shown), and a controller 60.

The bed 10 is formed in a nearly rectangular shape and located on a floor. However, the shape of the bed is not limited to rectangles. A pair of Z-axis guide rails 11a and 11b is formed on the upper surface of the bed 10, in parallel with each other in a right-and-left direction (a Z-axis direction) in FIG. 1. The table 20 is slidably disposed on the pair of Z-axis guide rails 11a and 11b. In addition, a Z-axis ball screw 11c for driving the table 20 in the right-and-left direction in FIG. 1 is disposed on the bed 10, between the pair of Z-axis guide rails 11a and 11b, where a Z-axis motor 11d for rotationally driving the Z-axis ball screw 11c is also provided.

Furthermore, a pair of X-axis guide rails 12a and 12b is formed on the upper surface of the bed 10, in parallel with each other in an up-and-down direction (an X-axis direction) in FIG. 1. A wheel slide 41 is slidably disposed on the pair of X-axis guide rails 12a and 12b. An X-axis ball screw 12c for driving the wheel slide 41 in the up-and-down direction in FIG. 1 is also disposed on the bed 10, between the pair of X-axis guide rails 12a and 12b, where a Z-axis motor 12d for rotationally driving the X-axis ball screw 12c is provided.

The table 20 is formed in a rectangular flat plate shape and slidably disposed on the pair of Z-axis guide rails 11a and 11b on the bed 10. The table 20 is connected to a nut member of the Z-axis ball screw 11c and is driven by the Z-axis motor 11d so as to move in the pair of Z-axis guide rails 11a and 11b. The Z-axis motor 11d includes an encoder that detects a rotation angle of the Z-axis motor 11d.

The spindle head 30 is provided on the upper surface of the table 20 and rotatably supports a work W. In more detail, the spindle head 30 includes a spindle head body 31, a magnetic chuck 32, a shoe 33, and a spindle motor 34. The spindle head body 31 is fixed on the upper surface of the table 20 and on the left side of FIG. 1. The magnet chuck 32 is disposed on the spindle head body 31 so as to rotate around the Z axis. The magnetic chuck 32 holds the bearing (the work W) by drawing it by a magnetic force. The shoe 33 and the magnetic chuck 32 are provided in the spindle head 30. The shoe 33 locates the work W by supporting the side surface of the work W. The magnetic chuck 32 is driven by the spindle motor 34 so as to rotate with respect to the spindle head body 31. The spindle motor 34 includes an encoder that detects a rotation angle of the spindle motor 34.

A grinding wheel support device 40 includes a wheel slide 41, a grinding wheel drive motor 42, and a grinding wheel 43. The wheel slide 41 is slidably disposed on the pair of X-axis guide rails 12a and 12b on the upper surface of the bed 10. The wheel slide 41 is connected to the nut member of the X-axis ball screw 12c and driven by the X-axis motor 12d to move along the pair of X-axis guide rails 12a and 12b.

The grinding wheel drive motor 42 is fixed to an end surface of the wheel slide 41 in the X-axis direction which is on the spindle head 30 side. The grinding wheel 43 for grinding the track surface on the inner periphery of the bearing outer race (the work W) is provided at the end of the grinding wheel drive motor 42. In other words, the grinding wheel 43 is provided rotatably around the Z axis with respect to the wheel slide 41.

The proximity switch 50 is provided on the upper surface of the bed 10 to detect the start and end of a grinding cycle of the bearing outer race(the work W) by the grinding wheel 43. In more detail, when the distance between the proximity switch 50 and the wheel slide 41 in the Z-axis direction becomes a set value or less as the wheel slide 41 approaches the proximity switch 50, the proximity switch 50 determines that the grinding cycle is started. On the other hand, when the distance between the proximity switch 50 and the wheel slide 41 in the Z-axis direction exceeds the set value as the wheel slide 41 moves away from the proximity switch 50, the proximity switch 50 determines that the grinding cycle is ended.

The contact detection sensor 80 is provided on the side surface of the spindle head body 31 and detects the start of the grinding of the bearing outer race (the work W) by the grinding wheel 43. In more detail, when the grinding wheel 43 comes into contact with the work W, the contact detection sensor 80 detects the contact and determines that the grinding is started. An acoustic emission sensor (hereinafter referred to as an AE sensor), for example, is used as the contact detection sensor 80. The contact detection sensor 80 in this embodiment is used to determine the start and end of a grinding load data collection. The start and end of the grinding load data collection can also be determined based on the X-axial position of the wheel slide 41 and the Z-axial position of the table 20, without using the contact detection sensor 80.

The grinding wheel forming device (not shown), which is provided on the spindle head 30 or on the bed 10, for example, is a dresser which forms the outer peripheral surface of the grinding wheel 43. The grinding wheel 43 dressed by the grinding wheel forming device has a good cutting quality and is formed in a desired shape.

The controller 60 performs a grinding of the track surface on the inner periphery of the bearing outer race (the work W) by controlling each motor, rotating the work W around the Z axis, rotating the grinding wheel 43, and moving the work W relative to the grinding wheel 43 in the Z-axis and X-axis directions. This will be described hereinafter in more detail. The controller 60 is also equipped with a grinding abnormality monitoring device 70 which monitors abnormality in the grinding of the work W. However, the grinding abnormality monitoring device 70 is not limited to devices which are provided inside the controller 60, but can also be applied to external devices.

(2. Explanations of Grinding Abnormality Types)

Next, explanation will be given for grinding abnormality types monitored by the grinding abnormality monitoring device 70. The grinding abnormality types include (A) generation of abnormal grinding load, (B) abnormalities due to variation in the shape of the work W caused by preprocessing, (C) surface abnormalities of the grinding wheel 43, (D) defective surface roughness of the work W after the grinding, and others.

Figure 2A:
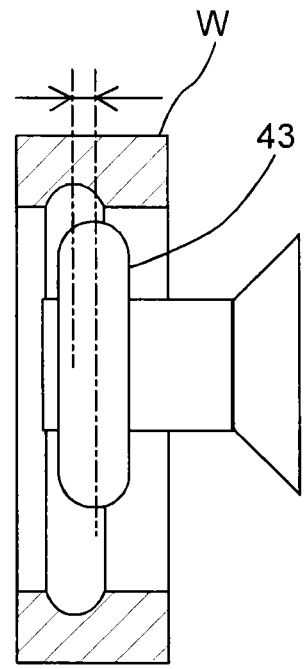
FIG. 2A shows a grinding abnormality type due to variation in the shape when the axial center of the grinding wheel 43 and the axial position of the track surface on the inner periphery of the bearing outer race deviate from each other.

(B) abnormalities due to variation in the shape of the work W caused by preprocessing will be explained with reference to FIG. 2A and FIG. 2B. In some cases, when a groove, which is the track surface on the inner periphery of the bearing outer race (the work W), is ground by the grinding wheel 43, the axial position (Z-axial position) of the groove created by preprocessing may deviate from a desired position as shown in FIG. 2A. Such a deviation causes the axial center of the grinding wheel 43 to deviate from the axial position of the track surface on the inner periphery of the bearing outer race. As a result, when the track surface on the inner periphery is ground by the grinding wheel 43, shoulder contact occurs partially, resulting in partial increase in the grinding load. Then, coming off of abrasive grains or cracking occurs partially in the grinding wheel 43. When the work W with a groove in the desired position is ground after such conditions occur, the work W may not be ground to the desired shape.

Figure 2B:
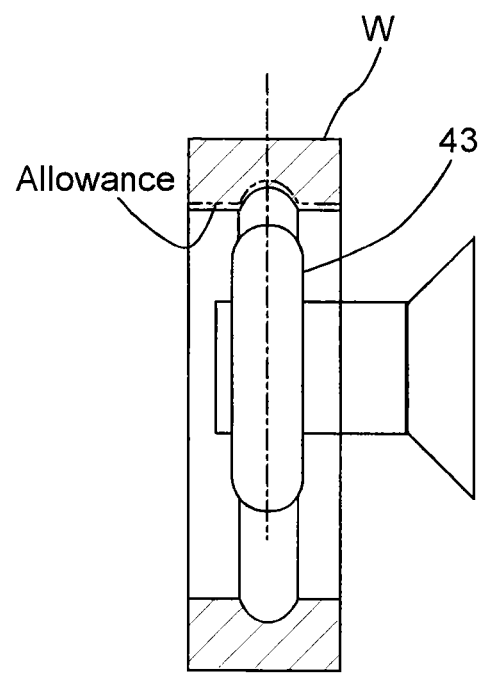
FIG. 2B shows a grinding abnormality type due to variation in the shape when the depth of the groove, i.e., the track surface on the inner periphery of the bearing outer race, deviates from the desired depth.

In other cases, the depth of the groove, i.e., the track surface on the inner periphery of the bearing outer race, which is created by preprocessing, may deviate from the desired depth as shown in FIG. 2B. As a result, grinding allowance varies among the works W. Particularly, when the depth of the groove is deeper than the desired depth, the groove partly remains unground during the grinding, which may lead to defective surface roughness.

(C) surface abnormalities of the grinding wheel 43 include flattening of abrasive grains due to incorrect dressing of the grinding wheel 43 (e.g. an abnormal dressing allowance or a poor cutting quality of the dresser), coming off of abrasive grains due to a large grinding load, deterioration of the cutting quality of the grinding wheel 43 due to abrasive grain wear, and attachment of molten scrapes to the surface of the grinding wheel 43 due to a large grinding load or an insufficient amount of coolant.

(3. Structure of Grinding Abnormality Monitoring Device)

Figure 3:
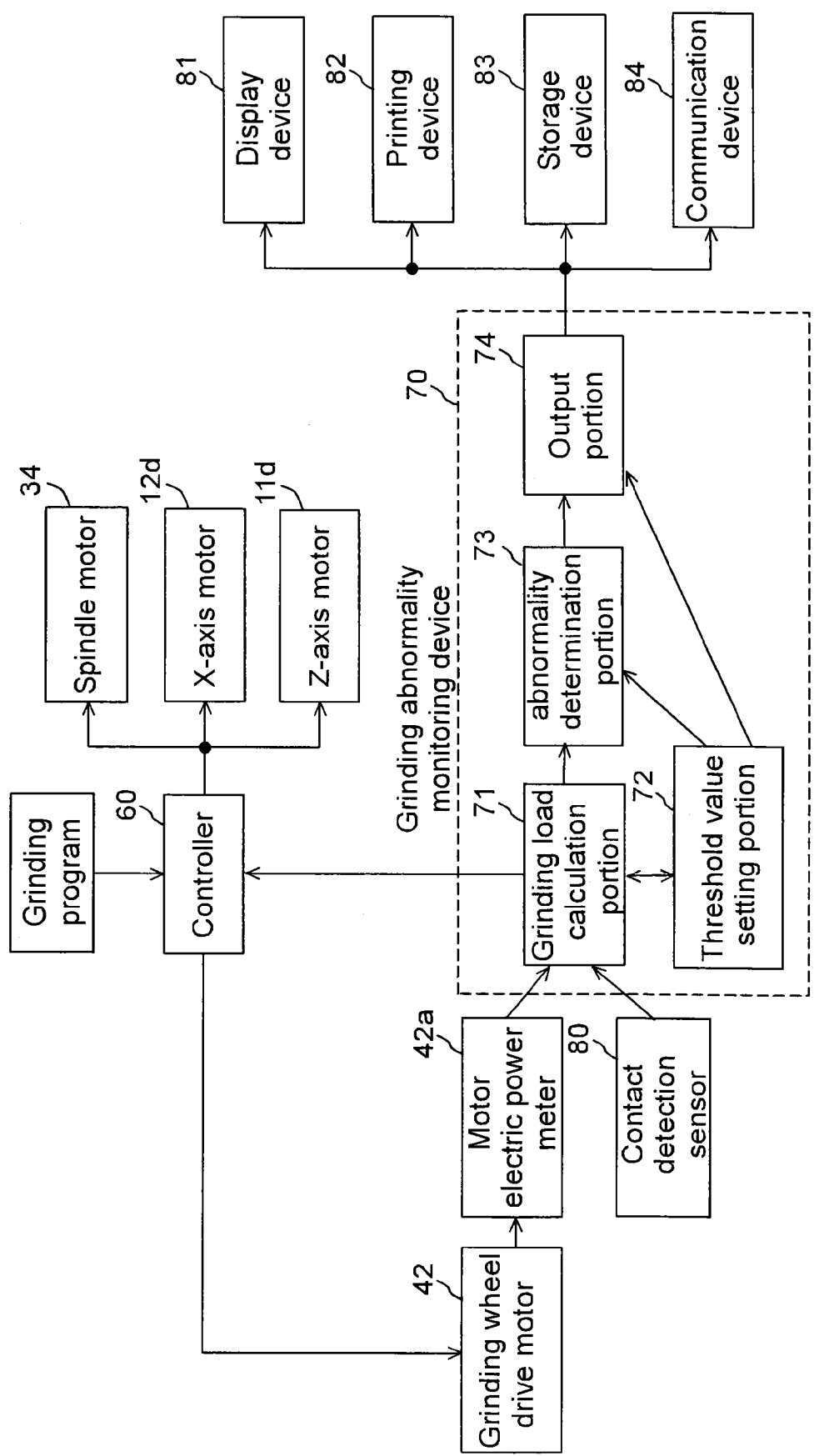
FIG. 3 is a functional block diagram of the grinding abnormality monitoring device.

Next, the grinding abnormality monitoring device 70 will be explained with reference to the functional block diagram in FIG. 3. For explaining the grinding abnormality monitoring device 70 here, some portions of the structure of the above-mentioned grinding machine 1 is also described in FIG. 3. It is noted here that, the same structural portions as those of the grinding machine 1 in FIG. 1 are referred to as the same numerals as those of the grinding machine 1 in FIG. 1 in FIG. 3. The grinding wheel drive motor 42 is equipped with a motor electric power meter that measures a driving electric power of the grinding wheel drive motor 42. Electric power values may be directly obtained by using the motor amplifier of the grinding wheel drive motor 42, instead of using the motor electric power meter 42a.

The grinding abnormality monitoring device 70 is structured so as to include a grinding load calculation portion 71, a threshold value setting portion 72, an abnormality determination portion 73, and an output portion 74. The grinding load calculation portion 71 calculates the grinding load generated by the grinding of the work W by using the grinding wheel 43 based on the driving electric power of the grinding wheel drive motor 42 obtained from the motor electric power meter 42a. The grinding load increases as the driving electric power of the grinding wheel drive motor 42 increases.

While the grinding load is calculated by using the driving electric power of the grinding wheel drive motor 42 in this embodiment, the grinding load can also be calculated as described below. For example, the grinding load can be calculated based on values such as a current value of the grinding wheel drive motor 42, a current value or an electric power value of the X-axis motor 12d which moves the grinding wheel 43 relative to the work W, a current value or an electric power value of the spindle motor 34 which rotatably drives the work W, or a deflection amount of a supported portion of the grinding wheel 43 or the work W.

The grinding load can also be calculated based on a deflection amount of a portion to be ground of the work W, in other words, a deflection amount of the work W caused by being pressed against the grinding wheel 43. This is because the deflection amount varies according to the grinding load. The deflection amount of the portion to be ground of the work W is measured by, for example, a displacement sensor.

The grinding load can also be calculated based on a temperature of the portion to be ground of the work W because the temperature varies according to the grinding load. However, it is difficult to measure the temperature of a contact point of the work W with the grinding wheel 43, i.e., a point to be ground. Therefore, the temperature of a point out of phase with the point to be ground (the contact point with the grinding wheel 43) within the portion to be ground of the work W (inner peripheral surface or outer peripheral surface) is measured. The temperature of the portion to be ground of the work W differs between the point to be ground and the point out of phase with the point to be ground. However, the temperature of the point out of phase with the point to be ground corresponds to that of the point to be ground. Thus, the temperature measured at the point out of phase with the point to be ground is satisfactory. The temperature of the point out of phase with the point to be ground in the portion to be ground of the work W is measured by a contact temperature sensor which is in contact with the measurement point or a non-contact temperature sensor which is not in contact with the measurement point.

The threshold value setting portion 72 stores an upper limit threshold value Th1 and a lower limit threshold value Th2 of a normal area set by an operator. The upper limit threshold value Th1 and the lower limit threshold value Th2 are the threshold values of the grinding load, which are set according to an elapsed time T from the start of the grinding of the work W. Furthermore, the threshold value setting portion 72 sets a plurality of abnormality-classified areas according to the abnormality type for abnormal areas beyond the upper limit threshold value Th1 or below the lower limit threshold value Th2. The grinding abnormality types includes (A) generation of grinding load abnormality, (B) abnormalities due to variation in the shape of the work W caused by preprocessing, (C) surface abnormalities of the grinding wheel 43, (D) defective surface roughness of the work W after the grinding, and others as described before. The upper limit threshold value Th1, the lower limit threshold value Th2, and the abnormality-classified areas will be described hereinafter in more detail. While it is desirable to set both the upper limit threshold value Th1 and the lower limit threshold value Th2, only one of them may be set.

The abnormality determination portion 73 determines the grinding to be abnormal when an actual grinding load calculated by the grinding load calculation portion 71 exceeds the upper limit threshold value Th1 or falls below the lower limit threshold value Th2 according to the elapsed time from the start of the grinding. When the grinding is determined to be abnormal, the abnormality determination portion 73 also determines the type of the grinding abnormality based on the abnormality-classified area which the actual grinding load reaches.

When the grinding is determined to be abnormal, the output portion 74 performs processing such as displaying on the screen of a display device 81, printing by using a printing device 82, storing in a storage device 83, or communication outputting to an external device by using a communication device 84 regarding information on the grinding abnormality. Output form is selected by the worker. Accordingly, the worker can make sure to recognize the grinding abnormality regarding the information on the grinding abnormality in the form of output selected by the worker.

(4. Processing by Grinding Abnormality Monitoring Device)

Next, processings by the grinding abnormality monitoring device 70 will be explained with reference to FIGS. 4 to 8. Explanation will be given for the processings by the grinding abnormality monitoring device 70: first, execution of a threshold value setting program, and then execution of an abnormality monitoring program.

(4-1. Threshold Value Setting Program)

As one of the processings by the grinding abnormality monitoring device 70, the threshold value setting program is executed first. The execution of the threshold value setting program will be explained with reference to FIGS. 4 to 7. Each portion of the grinding abnormality monitoring method 70 and each portion of the grinding machine 1 will be used for explaining the execution of the threshold value setting program.

When a trial grinding of at least one work W is operated, the threshold value setting program detects a trial grinding load and set the upper limit threshold value Th1, the lower limit threshold value Th2, and the abnormality-classified areas (A1) to (D1) based on the trial grinding load at the time. The details will be explained below.

Figure 4:
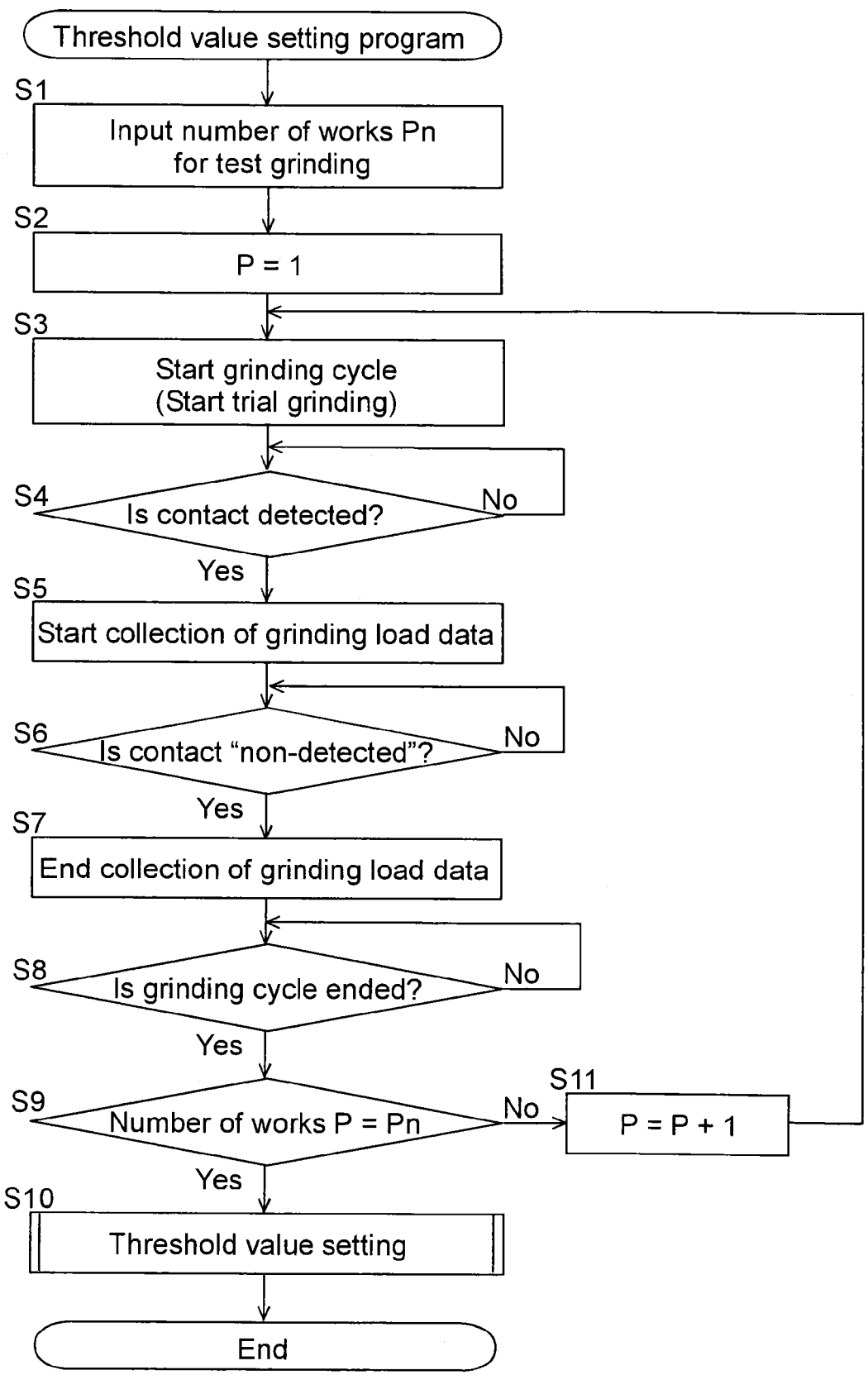
FIG. 4 is a flowchart of the threshold setting program.

As shown in FIG. 4, the worker inputs the number Pn of the works W for the trial grinding (Step S1). The trial grinding is operated before an actual grinding on the works W of the same kind as those for the actual grinding. The number Pn of the works W for the trial grinding is at least one, which can be set arbitrarily. Next, the worker sets the actual number P of the works W for the trial grinding to 1 (Step S2).

Then, when the proximity switch 50 is changed to an ON state, a grinding cycle of the trial grinding is started (Step S3). When the grinding cycle is started, the controller 60 to drives each motor and the grinding wheel 43 starts the grinding of the track surface on the inner periphery of the bearing outer race (the work W). In more detail, when the grinding cycle is started, the wheel slide 41 is moved from a reference position (not shown) in the X-axis direction toward a position where the grinding wheel 43 can enter an inside of the bearing outer race (the work W) in a radial direction. After that, the table 20 is moved in the Z-axis direction, which causes the grinding wheel 43 to enter the inside of the bearing outer race (the work W) in the radial direction. Then the grinding wheel 43 moves in the X-axis direction toward the track surface on the inner periphery of the bearing outer race (the work W) and starts the grinding. As for the grinding of the work W, a rough grinding is operated and then followed by a finish grinding. When the the grinding is ended, the operation is performed in reverse order of that performed before the start of the grinding, the wheel slide 41 returns to the reference position, then the grinding cycle is ended.

After the grinding cycle in Step S3 is started, the grinding abnormality monitoring device 70 determines whether a contact between the wheel slide 43 and the work W is detected by the contact detection sensor 80 (Step S4). The threshold value setting program waits until the contact is detected (Step S4: No).

When the contact is detected (Step S4: Yes), a grinding load data collection is started (Step S5). In other words, when the grinding wheel 43 comes into contact with the work W, the grinding load data collection is started. In more detail, the grinding load calculation portion 71 shown in FIG. 3 obtains an electric power value of the grinding wheel drive motor 42 from the motor electric power meter 42a and calculates the trial grinding load. It is considered that the electric power value of the grinding wheel drive motor 42 is approximately proportional to the trial grinding load. Therefore, the motor electric power value as it is may be used as a replacement for the trial grinding load.

Next, the abnormality monitoring device 70 determines whether the contact is "non-detected" by the contact detection sensor 80 (Step S6). In more detail, when it is determined that the contact is not "non-detected", i.e., while the contact is being detected, the grinding load data collection is continued (Step S6: No). When it is determined that the contact is "non-detected", the grinding load data collection is ended (Step S7). Consequently, a collected grinding load data is a grinding load data collected over a period from the start of the rough grinding to the end of the finish grinding. Then, the abnormality monitoring device 70 determines whether the grinding cycle is ended depending on whether the proximity switch 50 goes into an OFF state (Step S8).

After the grinding cycle is ended (Step S8: Yes), the abnormality monitoring device 70 determines whether the actual number P of the works W for the trial grinding equals to the number Pn set in Step S1 (Step S9). When the actual number P of the works W for the trial grinding does not equal to the set number Pn, one is added to the actual number P of the works W for the trial grinding and the process is repeated from Step S3 (Step S11). In other words, the trial grinding is operated on the second and later works W and data is collected during the trial grinding. When the actual number P of the works W for the trial grinding becomes equal to the set number Pn in Step S9, threshold value setting is performed (Step S10).

Figure 6:
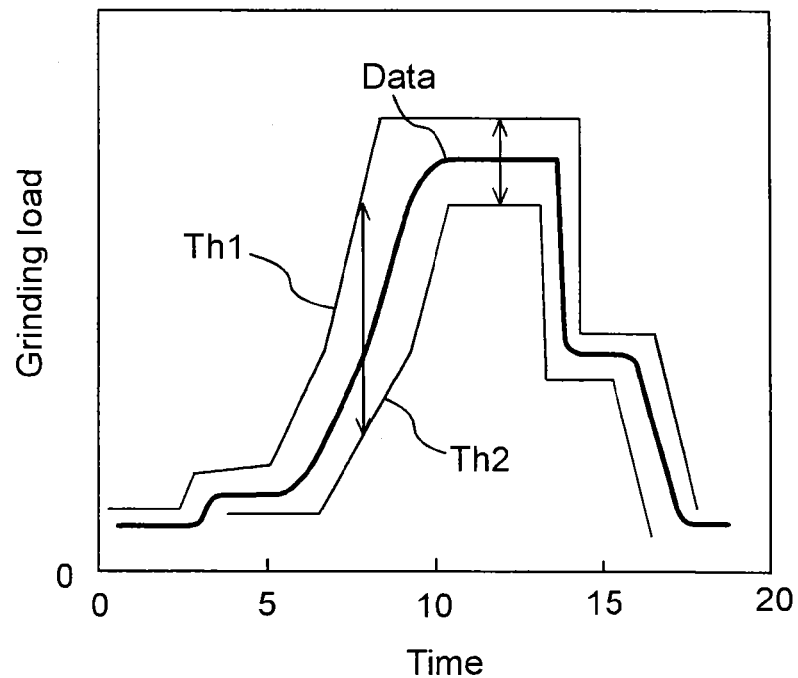
FIG. 6 is a graph of the grinding load in relation to the elapsed time from the start of the grinding, which shows the average value of the trial grinding load used in the trial grinding and the upper and lower threshold values of the normal range.

Explanation will be given below for one example of a behavior of the collected grinding load data with referenced to FIG. 6. Data in FIG. 6 shows the behavior of the average value of the grinding load data collected in a plurality of times. As shown by Data in FIG. 6, when the grinding is started and then the rough grinding is started (the period between time 1 and time 5), the grinding load increases rapidly. After that period, the rough grinding with a constant trial grinding load is operated until around time 13. Then the finish grinding is operated, and the trial grinding load finally becomes near zero.

Next, explanation will be given for the threshold value setting performed in Step S10 of the threshold value setting program shown in FIG. 4 with referenced to FIG. 5. The average value of the trial grinding load is calculated by using the collected grinding load data (Step S21). When the number Pn of works W for the trial grinding is one, the average value of the trial grinding load is the grinding load data as it is of that one work W.

Then, the calculated average values of the trial grinding loads are displayed on the screen of the display device 81 (Step S22). In other words, Data shown in FIG. 6 is displayed on the screen of the display device 81. Next, the upper limit threshold value Th1 and the lower limit threshold value Th2 of the range area are inputted (Step S23). The upper limit threshold value Th1 and the lower limit threshold value Th2 are set so as to vary according to the elapsed time from the start of the grinding as shown in FIG. 6. In other words, both the upper limit threshold value Th1 and the lower limit threshold value Th2 are set so as to follow the behavior of the trial grinding load.

Variation in the grinding load among the works W may differ, for example, between under a rapidly increasing load immediately after the start of the grinding and under a constant load. The grinding load varies more widely among the works W under the increasing grinding load immediately after the start of the grinding, compared to under the constant grinding load. Therefore, for example, the range between the upper limit threshold value Th1 and the lower limit threshold value Th2 (the permissible range) under the increasing trial grinding load is set wider than that under the constant trial grinding load. Consequently, grinding abnormality determination can be performed with a higher accuracy.

Figure 7:
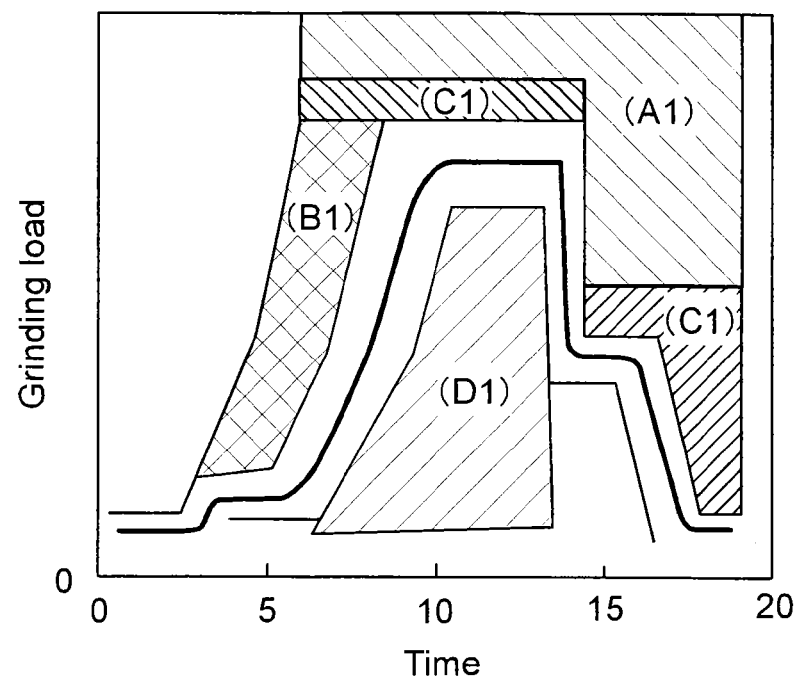
FIG. 7 is a graph of the grinding load in relation to the elapsed time from the start of the grinding, which shows the abnormality-classified areas.

After the upper limit threshold value Th1 and the lower limit threshold value Th2 are set, the abnormality-classified areas according to the abnormality type are set (Step S24). The abnormality-classified areas will be explained with reference to FIG. 7. As shown in FIG. 7, the abnormality-classified areas, i.e., generation of abnormal grinding load (A1), abnormalities due to variation in the shape of the work W caused by preprocessing (B1), surface abnormalities of the grinding wheel 43(C1), and defective surface roughness of the work W after the grinding (D1) are set for the abnormality types (A), (B), (C), and (D), respectively.

Figure 5:
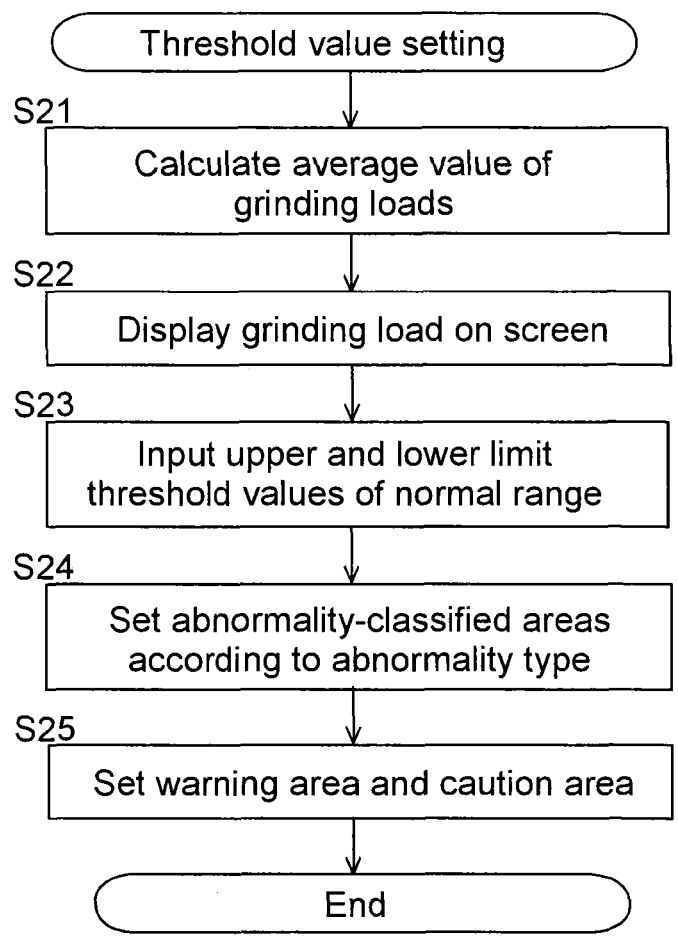
FIG. 5 is a flowchart of the threshold value setting performed in the threshold value setting program.

Explanation goes back to FIG. 5. After Step 24 in FIG. 5, a warning area and a caution area are set (Step S25), and then the threshold value setting is completed. Each of the abnormality-classified areas shown in FIG. 7 is set as the warning area or as the caution area. In more detail, (A1) generation of abnormal grinding load is set as "the warning area", and the other abnormality-classified areas are set as "the caution area". It is noted here that, the warning area is an area where the continuation of the grinding for a next work W is prohibited, and the caution area is an area where the continuation of the grinding for the next work W is allowed because the abnormality level is low.

(4-2). Abnormality Monitoring Program)

Next, explanation will be given for an abnormality monitoring program. Execution of the abnormality monitoring program will be explained with reference to FIG. 8. The abnormality monitoring program determines whether any grinding abnormality is generated based on the actual grinding load at the present moment and the previously set threshold values Th1 and Th2. If it is determined a grinding abnormality is generated, the abnormality monitoring program determines the grinding abnormality type based on the abnormality-classified areas (A1) to (D1). The details will be explained below.

Figure 8:
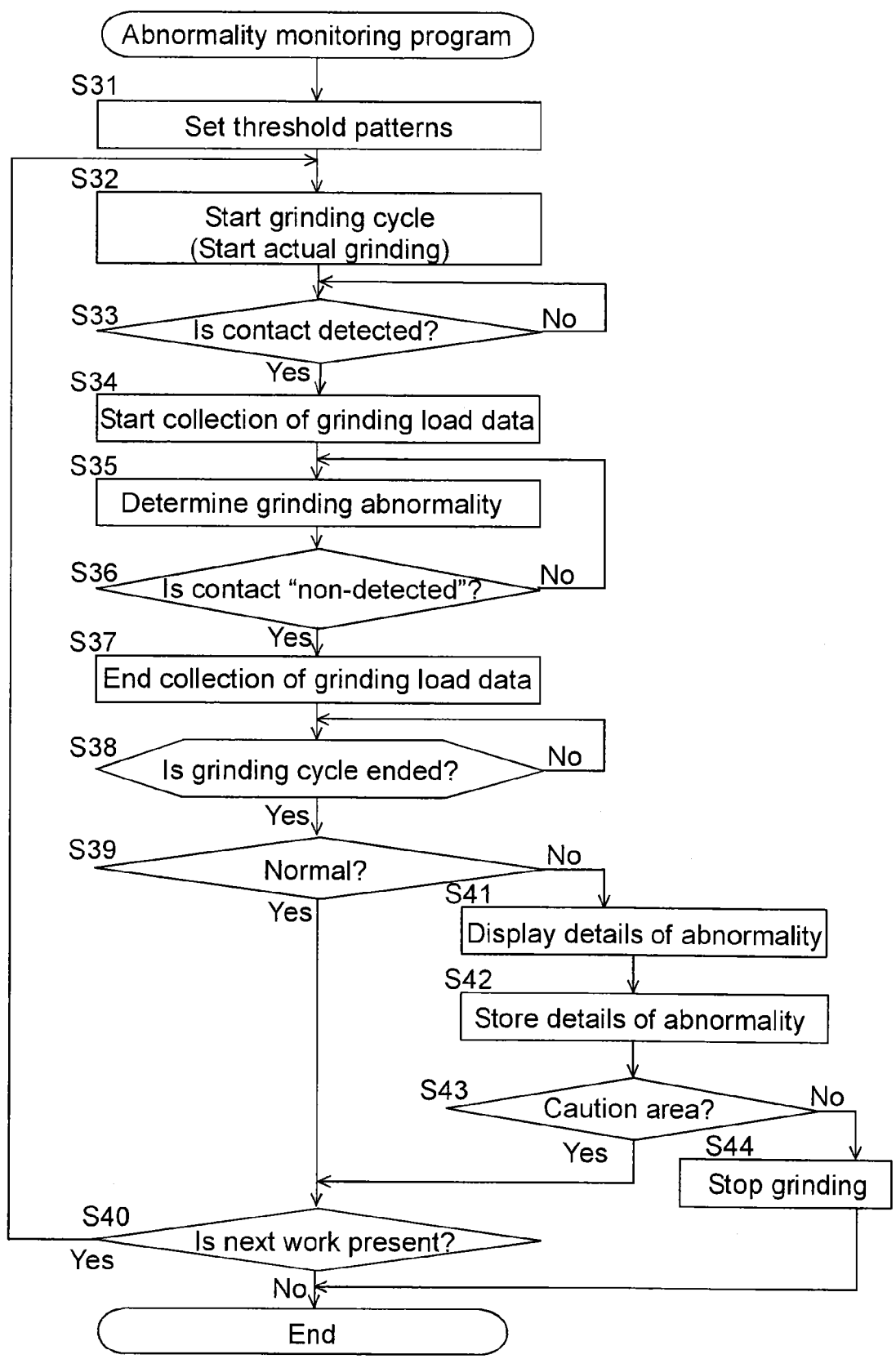
FIG. 8 is a flowchart of the abnormality monitoring program.

As shown in FIG. 8, the threshold value setting program is executed first as explained above to set threshold value patterns (Step S31). In other words, the threshold values Th1, Th2, and the abnormality-classified areas (A1) to (D1) are set. Then, when the proximity switch 50 is changed to the ON state, a grinding cycle of the actual grinding is started (Step S32). When the grinding cycle is started, the respective portions of the grinding machine 1 operate in the same way as explained for the trial grinding. After the grinding cycle is started, the grinding abnormality monitoring device 70 determines whether a contact between the wheel slide 43 and the work W is detected by the contact detection sensor 80. (Step S33). The abnormality monitoring program waits until the contact is detected (Step S33: No).

When the contact is detected (Step S33: Yes), the grinding load data collection is started (Step S34). In more detail, the grinding load calculation portion 71 shown in FIG. 3 obtains an electric power value of the grinding wheel drive motor 42 from the motor electric power meter and calculates the actual grinding load. As is the case with the trial grinding, it is considered that the electric power value of the grinding wheel drive motor 42 is approximately proportional to the actual grinding load. Therefore, the motor electric power value as it is may be used as a replacement for the actual grinding load.

Immediately after the start of the grinding load data collection, grinding abnormality determination is performed (Step S35). In other words, the grinding abnormality monitoring device 70 determines whether any grinding abnormality is generated based on the actual grinding load at the present moment as shown in FIG. 7. In more detail, the grinding abnormality monitoring device 70 determines whether the actual grinding load at the present moment exceeds the upper limit threshold value Th1 or falls below the lower limit threshold value Th2. Furthermore, if the actual grinding load at the present moment is determined to be abnormal, the grinding abnormality type is determined. In more detail, the grinding abnormality type is determined based on which of the abnormality-classified areas (A1) to (D1) the actual grinding load at the present moment falls on.

Next, the grinding abnormality monitoring device 70 determines whether the contact is "non-detected" by the contact detection sensor 80 (Step S36). When it is determined that the contact is not "non-detected", i.e., while the contact is being detected, the grinding load data collection is continued (Step S36: No). When it is determined that the contact is "non-detected", the grinding load data collection is ended (Step S37). When the grinding load data collection is ended, grinding abnormality determination is ended at the same time. Then, the grinding abnormality monitoring device 70 determines whether the grinding cycle is ended based on whether the proximity switch 50 goes to the OFF state (Step S38).

After the grinding is ended (Step S38: Yes), the grinding abnormality monitoring device 70 determines whether a result of grinding abnormality determination is normal (Step S39). When the result is determined to be normal, the grinding abnormality monitoring device 70 determines whether the next work W is present (Step S40). When the next work W is present, the process is repeated from Step S32. When the next work W is not present, the abnormality monitoring program is ended.

On the other hand, when the grinding abnormality monitoring device 70 determines that the result of grinding abnormality determination is abnormal, details of the abnormality are outputted from the output portion 74 and are displayed on the display device 81 (Step S41). The details of the abnormality outputted from the output portion 74 are also stored in the storage device 83 (Step S42). It is noted here that a large number of the works W of the same kind are ground in this embodiment. Therefore, if the grinding abnormality monitoring device 70 determined that an grinding abnormality was generated in a past work W, details of the abnormality have been stored in the storage device 83. In other words, the grinding abnormality history has been stored in the storage device 83.

After the details of the abnormality is stored in Step S42, the grinding abnormality monitoring device 70 determines whether the grinding abnormality type falls within the caution area (Step S43). When the abnormality type falls within the abnormality-classified area (B1) abnormalities due to variation in the shape of the work W caused by preprocessing, (C1) surface abnormalities of the grinding wheel 43, or (D1) defective surface roughness of the work W after grinding, the abnormality type falls within the caution area. When the abnormality type falls within the caution area, the process moves to Step S40. When the next work W is present, the process is repeated from Step S32.

If the abnormality type does not fall within the caution area in Step S43, that is, the abnormality type falls within the warning area, the controller 60 stops the grinding and the abnormality monitoring program is ended. In other words, if any abnormality in the warning area is generated, the grinding by the grinding machine 1 is stopped (Step S44).

(5. History Display Status on Screen of Display Device)

Next, a status of history display on the screen of the display device 81 will be explained with reference to FIG. 9. Through the execution of the grinding abnormality monitoring program in FIG. 8, if any grinding abnormality is generated (Step S39 in FIG. 8), details of the abnormality is stored in the storage device 83 (Step S42 in FIG. 8). In addition to the details of the abnormality, normal details may also be stored in the storage device 83. While the grinding abnormality monitoring program is being executed, a large number of the works W are ground. In other words, the abnormality history is stored in the storage device 83. It can be found that a work W which is not stored as grinding abnormality is normal. When the normal details are stored in the storage device 83, normal works W can be directly identified.

Then, every work W is displayed on the screen of the display device 81 as normal or grinding abnormality as shown in FIG. 9. In addition, if a work W is displayed as grinding abnormality, the grinding abnormality type and the time of abnormality generation are displayed. It is possible to recognize tendencies of the grinding abnormality and to investigate mechanisms of grinding the abnormality generation by storing the history of information on the grinding abnormality. Then, it is possible to predict the generation of the grinding abnormality in later grindings by using the tendencies of the grinding abnormality and the mechanisms of the grinding abnormality generation. Consequently, it is possible to decide on appropriate actions for the later grindings.

As explained above, the upper limit threshold value Th1 and the lower limit threshold value Th2 are set based on the trial grinding load during the trial grinding. Especially, the upper limit threshold value Th1 and the lower limit threshold value Th2 are set so as to vary according to the elapsed time from the start of the grinding. For example, the grinding load gradually increases after the start of the grinding, then stays approximately constant, and finally gradually decreases. When the rough grinding is followed by the finish grinding, the grinding load also varies according to the kind of grinding. In other words, it is possible to set appropriate threshold values according to each status during the period from the start to the end of the grinding by setting the upper limit threshold value Th1 and the lower limit threshold value Th2 so as to vary according to the elapsed time from the start of the grinding based on the trial grinding load during the trial grinding. Consequently, it is impossible to set highly-accurate threshold values, which was impossible with conventional constant threshold values. Furthermore, if the worker makes an error in inputting movement speed, the error can be found early by using the behavior of the trial grinding load during the trial grinding. Thus, production of a large number of defective products can be prevented.

The proximity switch 50 is used to determine the start and end of the grinding load data collection in the aforementioned embodiment. The start and end of the grinding load data collection can also be determined based on the X-axial position of the wheel slide 41 and the Z-axial positions of the table 20, without using the proximity switch 50.

<Second Embodiment>

Figure 10:
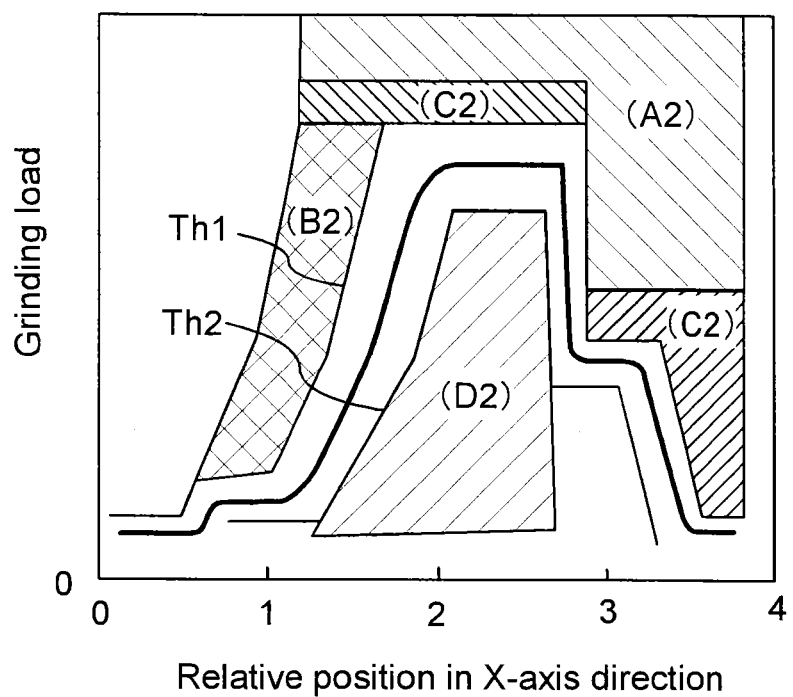
FIG. 10 (Second embodiment) is a graph of the grinding load in relation to the relative position of the work and the grinding wheel in the X-axis direction, which shows the upper limit threshold value and the lower limit threshold value of the normal range and the abnormality-classified area in abnormality area.

In the aforementioned embodiment, the figures regarding grinding load information are plotted with the elapsed time from the start of the grinding as the horizontal axis. The elapsed time from the start of the grinding can be replaced with the relative position of the grinding wheel 43 and the work W in the X-axis direction. FIG. 10 shows a relationship among the upper limit threshold value Th1, the lower limit threshold value Th2, and the abnormality-classified areas (A2), (B2), (C2), and (D2) in this embodiment. The behavior of the grinding load in relation to the elapsed time from the start of the grinding is substantially the same as the behavior of the grinding load in relation to the relative position in the X-axis direction. Therefore, the same results as those described above are also produced in this embodiment.

<Third Embodiment>

Next, the grinding abnormality monitoring device in a third embodiment will be explained. In the aforementioned embodiments of the grinding abnormality monitoring device 70, a large number of the works W of the same kind are supposed to be ground without changing grinding conditions. In this embodiment, the grinding conditions are changed so that the grinding load approaches the upper limit threshold value Th1 within the normal range. The details will be explained below.

(1. Structure of Grinding Abnormality Monitoring Device)

Figure 11:
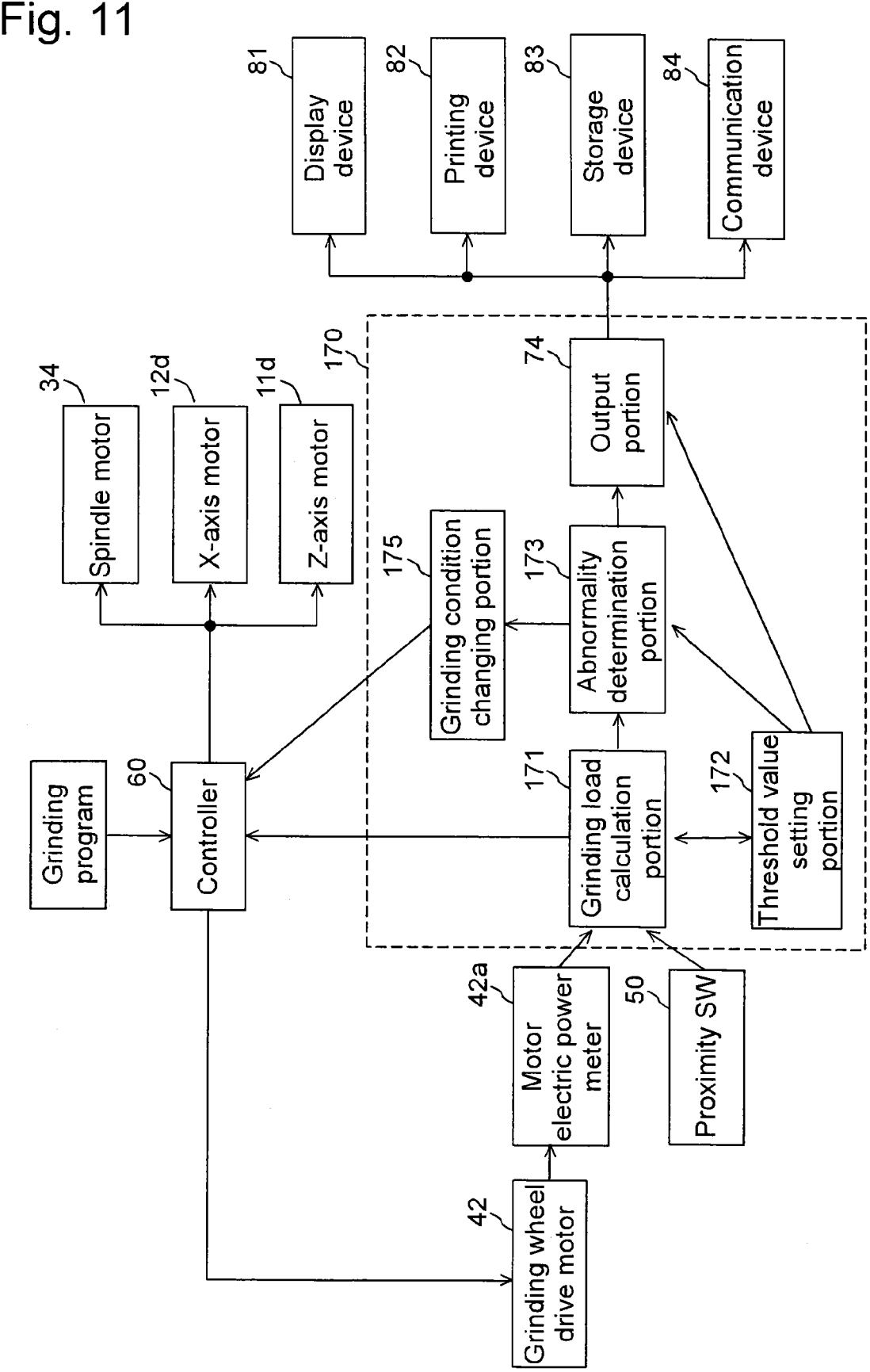
FIG. 11 (Third embodiment) is a functional block diagram of the grinding abnormality monitoring device.

A grinding abnormality monitoring device 170 in this embodiment will be explained with reference to FIG. 11. The grinding abnormality monitoring device 170 is structured so as to include a grinding load calculation portion 171, an abnormality determination portion 173, an output portion 74 (the same as that in the first embodiment), and a grinding condition changing portion 175. The portions other than the threshold value setting portion 172 and the grinding condition changing portion 175 in this embodiment differ from those in the first embodiment in the following respect. While the portions in the first embodiment use the grinding load according to the elapsed time from the start of the grinding, the portions in this embodiment use the grinding load according to the relative position of the grinding wheel 43 and the work W in the X-axis direction. In other words, the portions in this embodiment are in the same states as explained for the second embodiment.

The threshold value setting portion 172 sets a threshold value Th3 for changing grinding conditions which is near the upper threshold value Th1 in the normal range. If the actual grinding load falls below the threshold value Th3, the threshold value Th3 is used to change the grinding conditions so that the actual grinding load exceeds the threshold value Th3. The grinding condition changing portion 175 changes the grinding conditions so that the grinding time decreases when the abnormality determination portion 173 determines the result is normal. In more detail, when the actual grinding load at the present moment falls below the threshold value Th3 for changing grinding conditions, the grinding conditions are changed so that the actual grinding load exceeds the threshold value Th3 for changing grinding conditions. For example, the feed rate of the grinding wheel 43 relative to the work W in the X-axis direction is increased.

(2. Processings by Grinding Abnormality Monitoring Device)

Figure 12:
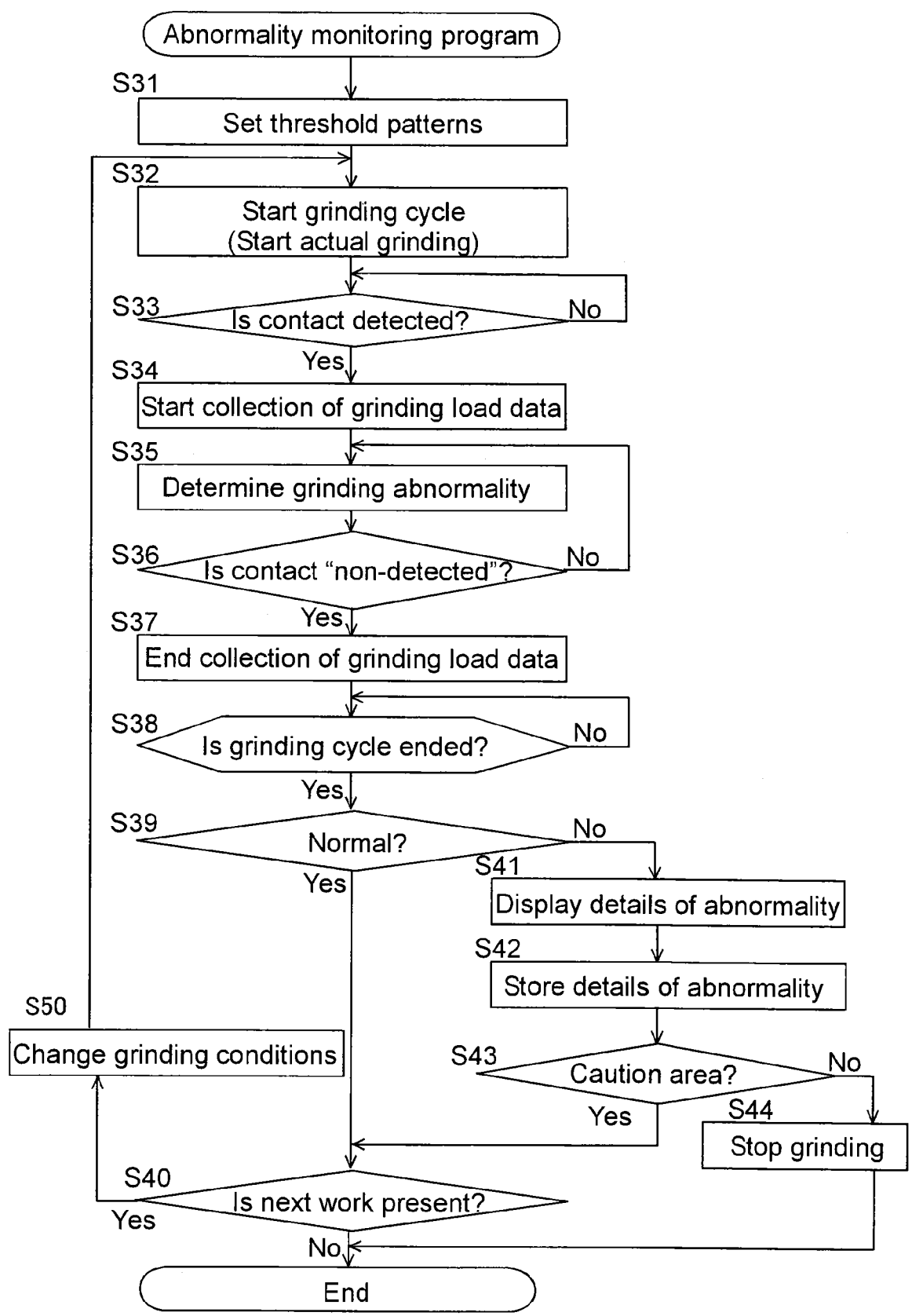
FIG. 12 is a flowchart of the abnormality monitoring program.

Processing by the grinding abnormality monitoring device 170 will be explained with reference to FIG. 12. It is noted here that the threshold value setting program is substantially the same as that in the first embodiment. The abnormality monitoring program in this embodiment differs from the abnormality monitoring program in the first embodiment in Step S50: Change grinding conditions as shown in FIG. 12. Because the other steps are common to both embodiments, they are referred to as the same numerals as those in the first embodiment and will not be explained.

Figure 13:
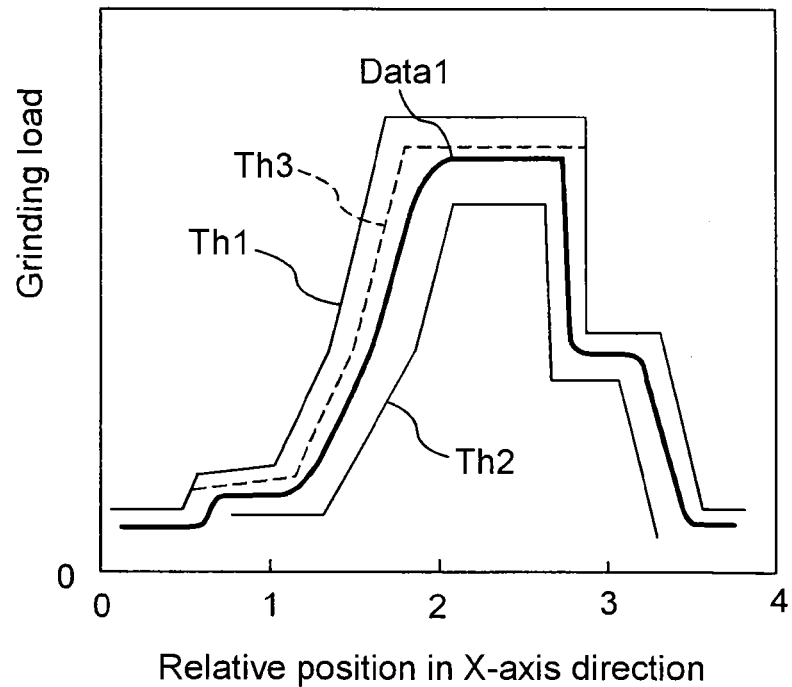
FIG. 13 is a graph of the grinding load in relation to the relative position of the grinding wheel and the work in the X-axis direction before the change of the grinding conditions, which shows the upper and lower threshold values of the normal range and the threshold value for changing the grinding conditions.

In the abnormality monitoring program, when the result is determined to be normal in Step S39 or when the grinding abnormality type is determined to fall within the caution area in Step S43 and the next work W is present (Step S40: Yes), the grinding conditions are changed (Step S50). Assume that the grinding load data with respect to the relative position collected at the present moment behaves as shown in FIG. 13. The grinding load data collected at the present moment falls below the threshold value Th3 for changing grinding conditions.

Then the difference between the grinding load data collected at the present moment and the threshold value Th3 for changing grinding conditions is calculated, and the feed rate of the grinding wheel 43 relative to the work W in the X-axis direction is increased according to the difference. Then the process is repeated from Step S32. In other words, the next work W is ground under the changed grinding conditions.

Figure 14:
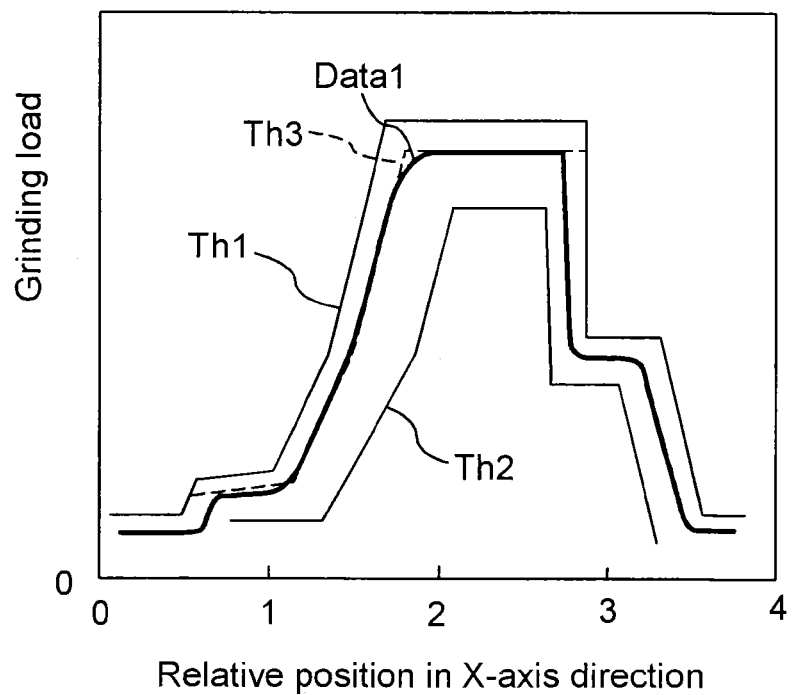
FIG. 14 is a graph of the grinding load in relation to the relative position of the grinding wheel and the work in the X-axis direction after the change of the grinding conditions, which shows the upper and lower threshold values of the normal range and the threshold value for changing the grinding conditions.
Figure 15:
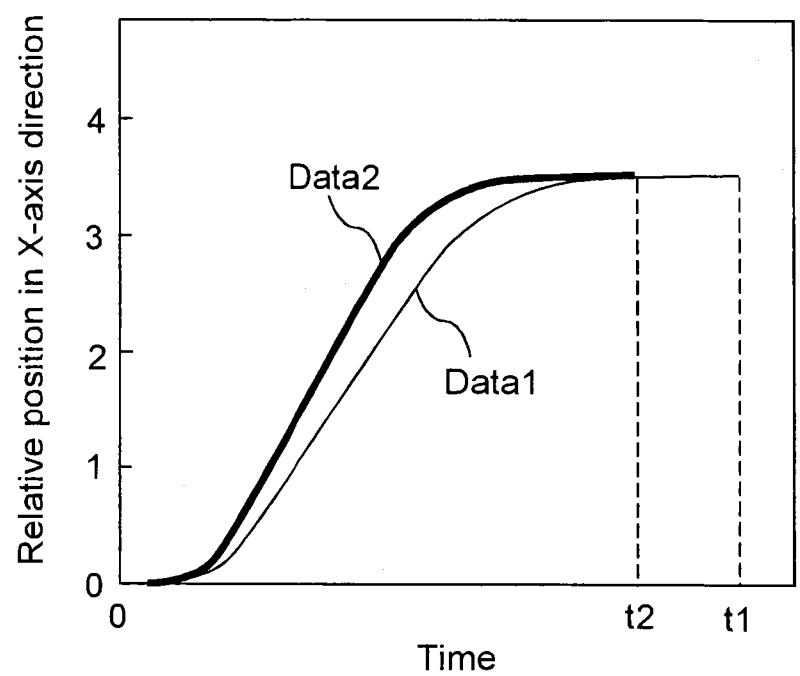
FIG. 15 is a graph of the relative positions of the work and the grinding wheel in the X-axis direction in relation to the elapsed time from the start of the grinding regarding the statuses of FIG. 13 and FIG. 14.

Assume that the grinding load data in the grinding operated under the changed grinding conditions behaves as shown in FIG. 14. In other words, the grinding load data is within the normal range and exceeds the threshold value Th3 for changing grinding conditions. In addition, the grinding times before and after the change of the grinding conditions are shown in FIG. 15. It can be seen that the grinding time after the change of the grinding conditions shown as Data 2 is shorter than the grinding time before the change of the grinding conditions shown as Data 1.

In other words, the grinding time, i.e., the grinding cycle time, can be decreased by changing the grinding conditions so that the grinding load approaches the upper limit threshold value Th1 within the range between the upper limit threshold value Th1 and the lower limit threshold value Th2. While the grinding time is changed by the change of the grinding conditions, the threshold values in relation to the relative position of the work W and the grinding wheel 43 are not changed by the change of the grinding conditions. Therefore, when the grinding conditions are changed, the threshold values Th1 and Th2 of the grinding load in relation to the relative position of the work W and the grinding wheel 43 are supposed to be used. Accordingly, the grinding conditions can be changed as described above.

<Fourth Embodiment>

In the aforementioned embodiments, explanation was given for a case in which a single portion of the work W is ground, a grinding load on the single portion to be ground is calculated, and the grinding load is used to monitor abnormality. On the other hand, the following embodiment can be employed to ground a plurality of portions of the work W at the same time. In other words, it is also possible to calculate grinding loads for the respective portions to be ground and to monitor the respective portions to be ground for abnormality by using the respective grinding loads. A fourth embodiment will be explained with reference to FIGS. 16 to 18.

Figure 16:
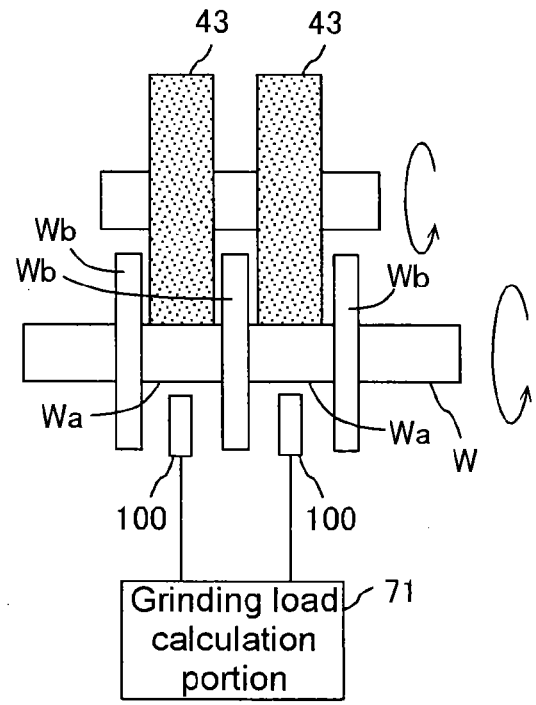
FIG. 16 shows the first example of the fourth embodiment.

A first example is shown in FIG. 16. A work W in the first example is formed in a shaft shape having a plurality of flange portions Wb, Wb, and Wb. The grinding wheels 43 and 43 grind outer peripheries of small-diameter shaft portions Wa and Wa which are located between the neighboring flange portions Wb, Wb, and Wb. A plurality of direction sensors 100 and 100 detect deflection amounts of points which are out of phase by 180 degrees with the points to be ground by the grinding wheels 43 and 43 within the outer peripheries of the respective small-diameter shaft portions Wa and Wa (the portions to be ground) of the work W.

The direction sensors 100 and 100 detect partial deflection amounts of the respective portions to be ground. Either sensors which are in contact with the work W or non-contact sensors may be used as the direction sensors 100 and 100. For example, eddy current sensors, which are a kind of non-contact sensors, may be applied. It is noted here that the deflection amounts vary according to the partial grinding loads of the respective portions to be ground. A grinding load calculation portion 71 (which corresponds to the grinding load calculation portion 71 shown in FIG. 3) calculates the grinding loads or values which correspond to the grinding load of the respective portions to be ground based on the deflection amounts detected by the direction sensors 100 and 100. Then the abnormality determination portion 73 shown in FIG. 3 determines whether any grinding abnormality is generated at the respective portions to be ground as in the aforementioned embodiments. Accordingly, it is possible to determine whether any grinding abnormality is generated for each of the plurality of portions to be ground.

The direction sensors 100 and 100 may be replaced by temperature sensors 100 and 100. As is the case with the direction sensors 100 and 100, either sensors which are in contact with the work W or non-contact sensors may be used as the temperature sensors 100 and 100. The temperature sensors detect temperatures of the respective portions to be ground of the work W. The temperature sensors 100 and 100 detect temperatures of points which are out of phase by, for example, 90 or 180 degrees with the points to be ground by the grinding wheels 43 and 43 within the outer peripheries of the small-diameter shaft portions Wa and Wa (the portions to be ground) of the work W. It is noted here that the temperature of the portion to be ground becomes higher as the grinding load increases. In other words, the temperatures detected by the respective temperature sensors vary according to the grinding loads of the portions to be ground. Then the grinding load calculation portion 71 calculates the grinding loads or values which correspond to the grinding load of the respective portions to be ground based on the temperatures of the respective portions to be ground.

Figure 17:
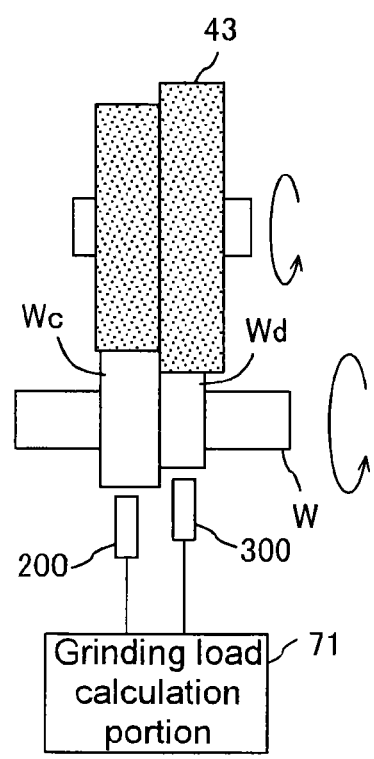
FIG. 17 show the second example of the fourth embodiment.

Next, a second example will be explained. As shown in FIG. 17, a work W in the second example has a large-diameter shaft portion We and a small-diameter shaft portion Wd which are connected in an axial direction. Portions to be ground of the work W are the outer periphery of the large-diameter shaft portion Wc, the outer periphery of the small-diameter shaft portion Wd, and the step surface between the large-diameter shaft portion Wc and the small-diameter shaft portion Wd. These portions are ground by an integral-type grinding wheel 43 at the same time.

Direction sensors 200 and 300 detect respective deflection amounts of the outer peripheries of the large-diameter shaft portion and the small-diameter shaft portion in a radial direction. Then the grinding load calculation portion 71 calculates the grinding loads or the values which correspond to the grinding loads of the respective portions to be ground based on the respective deflection amounts detected by the direction sensors 200 and 300. Then the abnormality detection determination portion 73 shown in FIG. 3 determines whether any grinding abnormality is generated at the respective portions to be ground as in the aforementioned embodiments. The direction sensors 200 and 300 may also be replaced by temperature sensors in this embodiment.

Figure 18:
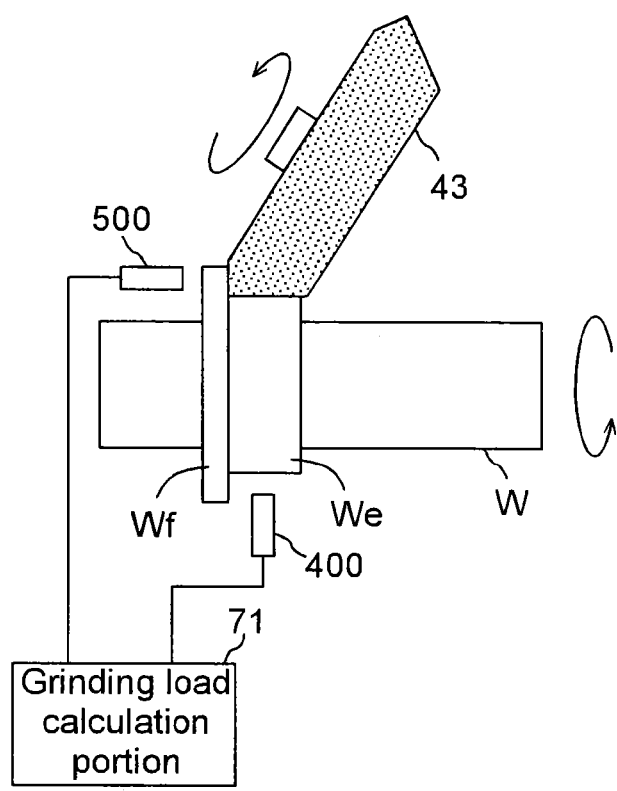
FIG. 18 shows the third example of the fourth embodiment.

Next, a third example will be explained. As shown in FIG. 18, a work W in the third example has a shaft portion We and a flange portion Wf. Portions to be ground of the work W are the outer periphery of the shaft portion and an end surface of the flange portion Wf. These portions are subjected to angular grounding by the outer periphery of the grinding wheel 43 (an angular grinding wheel). It is noted here that the angular grounding is a method of grinding in which the outer periphery and the end surface of the work W are ground with the axis of rotation of the grinding wheel inclined with respect to the axis of rotation of the work W.

The direction sensor 400 detects a deflection amount in a radial direction of the shaft portion We, one of the portions to be ground. On the other hand, the direction sensor 500 detects a deflection amount in a radial direction of the end face of the flange portion Wf, the other portion to be ground. Then the grinding load calculation portion 71 calculates the grinding loads or values which correspond to the grinding loads of the respective portions to be ground based on the respective deflection amounts detected by the direction sensors 400 and 500. Then the abnormality determination portion 73 shown in FIG. 3 determines whether any grinding abnormality is generated at the respective portions to be ground as in the aforementioned embodiments. The direction sensors 400 and 500 may also be replaced by temperature sensors in this embodiment.

In the first to third examples, the respective grinding loads of the plurality of portions to be ground are calculated by using the values detected by the direction sensors or the temperature sensors. Otherwise, one direction sensor or temperature sensor can be reduced by using the driving electric power of the grinding wheel drive motor 42 or others together as shown in the first embodiment. In other words, the grinding load generated over the entire work W is calculated based on the driving electric power of the grinding wheel drive motor 42, and the partial grinding load of the portion to be ground is calculated by using a direction sensor or a temperature sensor. For the portion to be ground for which neither direction sensor nor temperature sensor is provided, the grinding load can be calculate by subtracting the partial grinding loads from the grinding load of the entire work W.

<Others>

In the aforementioned embodiments, the rough grinding is switched to the finish grinding based on the elapsed time from the start of the grinding or the relative position of the grinding wheel 43 and the work W in the X-axis direction. On the other hand, there are cases where the finish grinding is started when the diameter of a portion to be ground of the work W reaches a set value by using a sizing device. In these cases, the sizing device or the control device outputs a start signal before the finish grinding is started. In an abnormality monitoring, it is possible to apply the threshold values for the rough grinding until the signal is acquired, and to apply the threshold values for the finish grinding after the signal is acquired. The timing to switch between the threshold values for the rough grinding and the threshold values for the finish grinding can also be decided by using the output signal from the sizing device or the control device.

EXPLANATION OF REFERENCE NUMERALS

In the drawings:
1: grinding machine, 10: bed, 30: spindle head, 40: grinding wheel support device, 41: wheel slide, 42: grinding wheel drive motor, 42a: motor electric power meter, 43: grinding wheel, 60: controller, 100, 200, 300, 400, 500: direction sensor or temperature sensor, W: work

The invention claimed is:

1. A grinding abnormality monitoring method for monitoring a grinding abnormality when a plurality of work pieces of a same kind is ground by use of a grinding machine which grinds a work piece by moving the work piece relative to a grinding wheel, the method comprising:
 a trial grinding load detection step of setting a number of work pieces for test grinding, and detecting a trial grinding load when a trial grinding of the set number of work pieces is performed;
 a threshold value setting step of setting at least one of upper and lower limit threshold values of the trial grinding load detected in the trial grinding load detection step, after the test grinding of the set number of work pieces has been completed, the upper and lower threshold values varying according to an elapsed time from a start of grinding of a given work piece or to a position of the given work piece relative to the grinding wheel;

performing actual grinding on a required number of work pieces to be ground, after performing the threshold value setting step during the trial grinding;

an actual grinding load detection step of detecting an actual grinding load when an actual grinding of the plurality of the work pieces is performed; and a grinding abnormality determination step of determining that the grinding abnormality is generated when the actual grinding load detected in the actual grinding load detection step exceeds the upper limit threshold value or falls below the lower limit threshold value, the upper and lower threshold values varying according to the elapsed time from the start of the grinding or to the position of the work piece relative to the grinding wheel.

2. The grinding abnormality monitoring method according to claim 1, wherein the threshold value setting step further includes steps for setting the upper and lower limit threshold values and a step of setting a width therebetween which varies according to the elapsed time from the start of the grinding or to the position of the work piece relative to the grinding wheel.

3. The grinding abnormality monitoring method according to claim 1,
further comprising an abnormality-classified area setting step of setting a plurality of abnormality-classified areas which is set depending on the type of abnormality of an abnormal area which is defined to be the value area exceeding the upper limit threshold value or falls below the lower limit threshold value,
wherein the grinding abnormality determination step determines the type of the abnormality based on the plurality of the abnormality-classified areas when the grinding abnormality is determined to be generated.

4. The grinding abnormality monitoring method according to claim 3, wherein each of the abnormality-classified areas is set to be a warning area where a continuation of grinding for a next work piece is prohibited or to be a caution area where the continuation of grinding for the next work piece is allowed.

5. The grinding abnormality monitoring method according to claim 1,
wherein the upper and lower limit threshold values correspond to the position of the work piece relative to the grinding wheel, and the method further comprising:
a grinding condition changing step of changing a grinding condition so that the actual grinding load on a work piece to be ground next is set to approach the upper limit threshold value when the actual grinding load on a current work piece is within the range between the upper and lower limit threshold values.

6. The grinding abnormality monitoring method according to claim 1, further comprising an abnormality information output step of performing screen displaying, printing, storing, or outputting to an external device regarding information on the grinding abnormality if the grinding abnormality determination step determines that the grinding abnormality is generated.

7. The grinding abnormality monitoring method according claim 6, wherein the abnormality information output step further includes a step of storing a history of information on the grinding abnormality.

8. The grinding abnormality monitoring method according to claim 1,
the method being applied to a grinding machine for simultaneously grinding a plurality of portions of the work piece;
wherein each of the trial grinding load detection step and the actual grinding load detection step further includes a step of detecting a deflection amount or a temperature of the plurality of portions of the work piece by using a plurality of direction sensors or temperature sensors and a step of calculating the respective grinding loads based on the deflection amount or the temperature;
the threshold value setting step further includes a step of setting at least one of the upper and lower limit threshold values for each of the plurality of portions of the work piece; and
wherein the grinding abnormality determination step further includes a step of determining whether any grinding abnormality is generated at the respective plurality of portions of the work piece based on the respective actual grinding loads.

* * * * *